(12) United States Patent
Fortune

(10) Patent No.: US 11,414,769 B2
(45) Date of Patent: Aug. 16, 2022

(54) WATER RESERVOIR AND ELECTROLYSIS CELL COMBINATION

(71) Applicant: Empire Hydrogen Energy Systems Inc., Sidney (CA)

(72) Inventor: Douglas Fortune, Sidney (CA)

(73) Assignee: Empire Hydrogen Energy Systems Inc., Sidney (CA)

( * ) Notice: Subject to any disclaimer, the term of this patent is extended or adjusted under 35 U.S.C. 154(b) by 371 days.

(21) Appl. No.: 16/714,878

(22) Filed: Dec. 16, 2019

(65) Prior Publication Data
US 2020/0198996 A1 Jun. 25, 2020

(30) Foreign Application Priority Data
Dec. 21, 2018 (CA) ................. CA 3028546

(51) Int. Cl.
| | | |
|---|---|---|
| *C25B 9/07* | (2021.01) | |
| *C25B 15/08* | (2006.01) | |
| *C25B 1/04* | (2021.01) | |
| *C02F 1/461* | (2006.01) | |
| *C25B 1/044* | (2021.01) | |
| *C25B 9/75* | (2021.01) | |
| *F02M 25/12* | (2006.01) | |

(52) U.S. Cl.
CPC ............ *C25B 9/07* (2021.01); *C02F 1/46104* (2013.01); *C25B 1/04* (2013.01); *C25B 1/044* (2021.01); *C25B 9/75* (2021.01); *C25B 15/08* (2013.01); *F02M 25/12* (2013.01); *Y02E 60/36* (2013.01)

(58) Field of Classification Search
CPC .... C25B 9/07; C25B 9/17; C25B 9/60; C25B 1/04; C25B 1/044; C25B 15/08; C02F 1/46104; C02F 1/4618
See application file for complete search history.

(56) References Cited

FOREIGN PATENT DOCUMENTS

CN          1065104 A  * 10/1992 ............. C25B 15/08

* cited by examiner

*Primary Examiner* — Salil Jain
(74) *Attorney, Agent, or Firm* — Finch & Maloney PLLC; Jay S. Franklin; Michael J. Bujold

(57) ABSTRACT

A water reservoir and electrolysis cell combination that has a flow connection between a lower fluid port of the water reservoir and an upper fluid port of the electrolysis cell. The flow connection includes a first conduit with an inner bore which serves as a first flow path for the flow of water by force of gravity from the water reservoir to an outlet for the first conduit positioned within the electrolysis cell. The second conduit is concentric to the first conduit and defines an annular space between the outer surface of the first conduit and the inner surface of the second conduit which serves as a second flow path for an upward flow of gas from the electrolysis cell to the water reservoir.

2 Claims, 2 Drawing Sheets

WATER RESERVOIR AND ELECTROLYSIS CELL COMBINATION

FIELD

There is described, in combination, a water reservoir and an electrolysis cell which uses electric current to dissociate water molecules.

BACKGROUND

In the process of electrolysis, electric current is used to dissociate the molecules of water to produce hydrogen gas and oxygen gas. This is reflected in the formula: $2\ H_2O = 2\ H_2 + O_2$.

SUMMARY

There is provided a water reservoir and electrolysis cell combination. An electrolysis cell is provided having an upper fluid port. A water reservoir is provided having a lower fluid port and an upper gas port. A flow connection is provided between the lower fluid port of the water reservoir and the upper fluid port of the electrolysis cell, with the water reservoir being positioned above the electrolysis cell. The flow connection includes a first conduit and a second conduit. The first conduit has an outer surface and an inner surface which defines an inner bore. The inner bore serves as a first flow path for the flow of water by force of gravity from the water reservoir to an outlet for the first conduit positioned within the electrolysis cell. The second conduit is concentric to the first conduit. The second conduit has an outer surface and an inner surface. An annular space is defined between the outer surface of the first conduit and the inner surface of the second conduit which serves as a second flow path for an upward flow of gas from an inlet positioned for the second conduit within the electrolysis cell to the water reservoir. The flow of gas exits the water reservoir via the upper gas port. In order to isolate accumulating gas, the inlet of the second conduit is positioned above the outlet of the first conduit.

The water reservoir and electrolysis cell combination described above is a simplified structure that relies upon a flow connection of concentric conduits, rather than multiple flow connections. The simplified structure is easier to build, easier to connect and easier to fit into confined spaces, such as found in an engine compartment of a motor vehicle.

It is preferred that the electrolysis cell has an internal support to support the first conduit and the second conduit with the inlet of the second conduit being positioned above the outlet of the first conduit.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
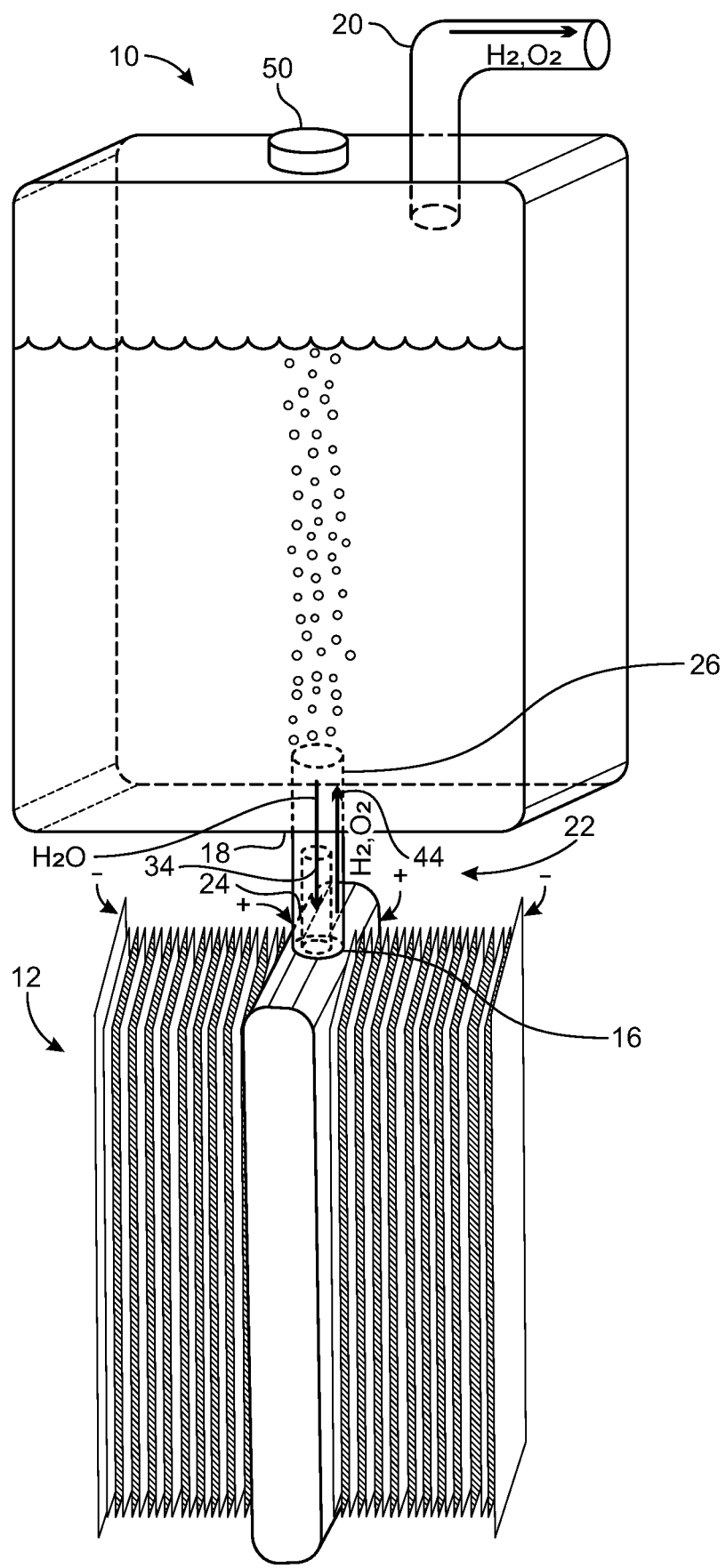
FIG. 1 is a front elevation view, in partial section, of a water reservoir and electrolysis cell combination.

A water reservoir and electrolysis cell combination generally identified by reference numeral 10, will now be described with reference to FIG. 1 and FIG. 2.

Structure and Relationship of Parts:

Referring to FIG. 1, water reservoir and electrolysis cell combination 10 includes an electrolysis cell 12 and a water reservoir 14. Electrolysis cell 12 has an upper fluid port 16. Water reservoir 14 has a lower fluid port 18 and an upper gas port 20.

Referring to FIG. 1, a flow connection 22 is provided between lower fluid port 18 of water reservoir 14 and upper fluid port 16 of electrolysis cell 12. It is to be noted that water reservoir 14 is positioned above electrolysis cell 12. Flow connection 22 includes a first conduit 24 and a second conduit 26.

Figure 2:
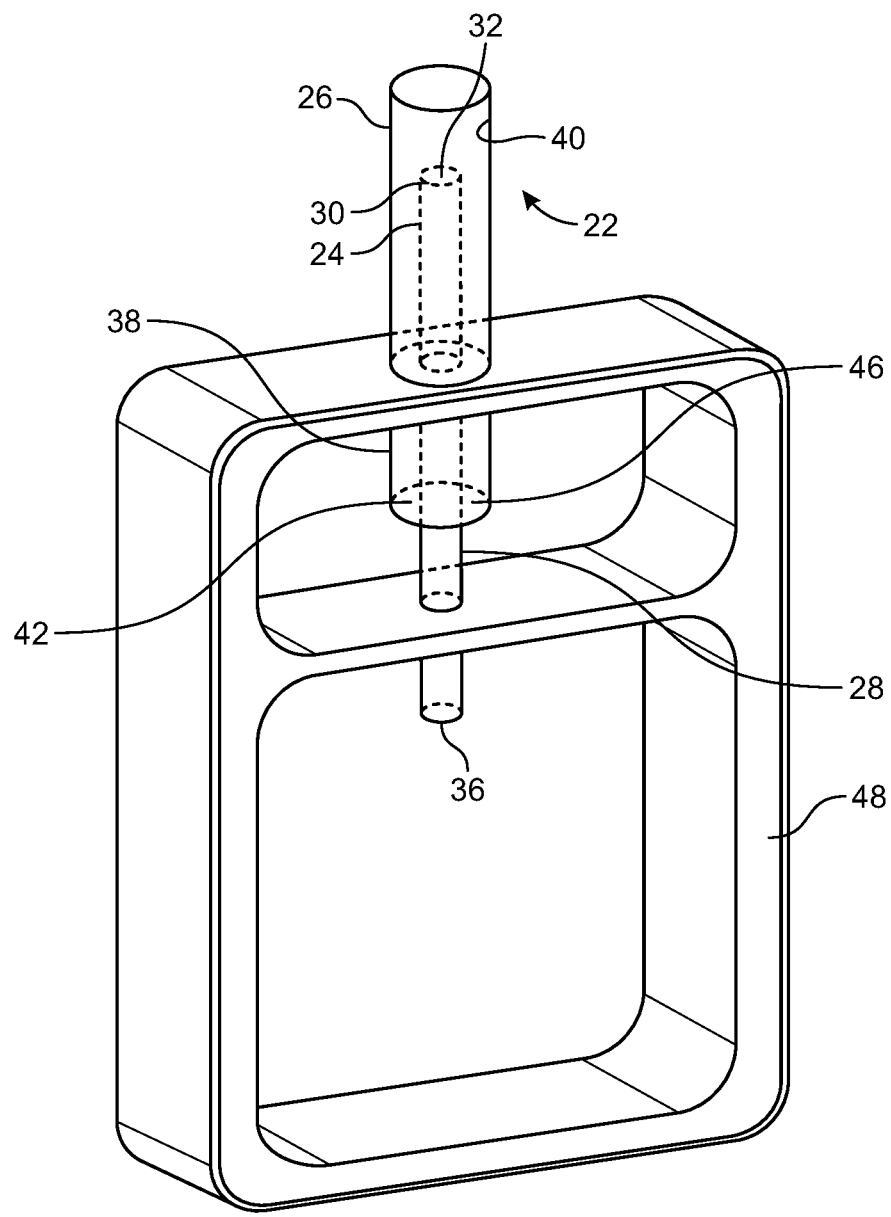
FIG. 2 is a perspective view of an internal support structure of the electrolysis cell of FIG. 1.

Referring to FIG. 1 and FIG. 2, first conduit 24 has an outer surface 28 and an inner surface 30 which defines an inner bore 32. Referring to FIG. 1, as shown by arrow 34, inner bore 32 serves as a first flow path for a flow of water by force of gravity from water reservoir 14 electrolysis cell 12. Referring to FIG. 2, water exits first conduit 24 through an outlet 36 positioned within electrolysis cell 12. Referring to FIG. 1 and FIG. 2, second conduit 26 is concentric to first conduit 24. Second conduit 26 has an outer surface 38 and an inner surface 40. An annular space 42 is defined between outer surface 28 of first conduit 24 and inner surface 40 of second conduit 26. Referring to FIG. 1, as shown by arrow 44, annular space 42 serves as a second flow path for an upward flow of gas. Referring to FIG. 2, second conduit 26 has an inlet 46 for an upward flow of gas positioned within electrolysis cell 12 to water reservoir 14.

Referring to FIG. 1, the flow of gas exits water reservoir 14 via upper gas port 20. Referring to FIG. 2, in order to isolate accumulating gas, inlet 46 of second conduit 26 for the upward flow of gas extends below upper fluid port 16 of electrolysis cell 12 and above outlet 36 for the gravity flow of water of first conduit 24.

Referring to FIG. 2, electrolysis cell has an internal support 48 to support first conduit 24 and second conduit 26 with inlet 46 of second conduit 26 positioned above outlet 36 of first conduit 24. A water fill opening with a closure cap 50 is positioned on water reservoir 14.

Operation:

Water reservoir and electrolysis cell combination 10 was developed for placement within a confined space defined by an engine compartment for a combustion engine in a motor vehicle. Referring to FIG. 1, water reservoir 14 is filled with water prior to use, with access to water reservoir for the addition of water being obtained by removing closure cap 50. Closure cap 50 is then put back in place. As shown by arrow 34, water flows along the first flow path of flow connection 22 provided by inner bore 32 of first conduit 24 by force of gravity from water reservoir 14 to electrolysis cell 12. When electrolysis cell 12 is activated by electric current, the water is dissociated by electrolysis into hydrogen gas and oxygen gas. Referring to FIG. 2, hydrogen gas and oxygen gas accumulate at the top of electrolysis cell 12, until the gas accumulation reaches inlet 46 of second conduit 26. Referring to FIG. 1, as shown by arrow 44, an upward flow of gas flows through annular space 42 into water reservoir 14. The gas continues to rise up through the water in water reservoir 14 until it reaches upper gas port 20.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A water reservoir and electrolysis cell combination, comprising:

an electrolysis cell having an upper fluid port;

a water reservoir having a lower fluid port and an upper gas port;

a flow connection between the lower fluid port of the water reservoir and the upper fluid port of the electrolysis cell, the water reservoir being positioned above the electrolysis cell, the flow connection comprising:

a first conduit having an outer surface and an inner surface which defines an inner bore which serves as a first flow path for the flow of water by force of gravity from the water reservoir to an outlet for the first conduit within the electrolysis cell;

a second conduit concentric to the first conduit, the second conduit having an outer surface and an inner surface, an annular space being defined between the outer surface of the first conduit and the inner surface of the second conduit which serves as a second flow path for an upward flow of gas from an inlet for the second conduit positioned within the electrolysis cell to the water reservoir, with the flow of gas exiting the water reservoir via the upper gas port, the inlet of the second conduit being positioned above the outlet of the first conduit.

2. The water reservoir and electrolysis cell combination of claim 1, where the electrolysis cell has an internal support to support the first conduit and the second conduit with the inlet of the second conduit being positioned above the outlet of the first conduit.

* * * * *